United States Patent [19]
Spath

[11] Patent Number: 5,324,156
[45] Date of Patent: Jun. 28, 1994

[54] APPARATUS FOR STORING AND DISCHARGING ROD-SHAPED WORKPIECES

[75] Inventor: Dieter Spath, Sasbachwalden, Fed. Rep. of Germany

[73] Assignee: Keuro Besitz GmbH & Co. EDV-Dienstleistungs KG, Achern-Gamshurst, Fed. Rep. of Germany

[21] Appl. No.: 966,348

[22] Filed: Oct. 26, 1992

[30] Foreign Application Priority Data

Nov. 14, 1991 [DE] Fed. Rep. of Germany ....... 4137440

[51] Int. Cl.$^5$ ............................................. B65G 1/04
[52] U.S. Cl. ................... 414/273; 414/745.1; 73/622
[58] Field of Search ............ 414/22.62, 273, 274, 414/745.1; 73/622, 638; 356/18

[56] References Cited

U.S. PATENT DOCUMENTS

| | | | |
|---|---|---|---|
| 4,363,585 | 12/1982 | Keller et al. | 414/273 |
| 4,642,017 | 2/1987 | Fenn | 414/273 X |
| 4,976,149 | 12/1990 | Ichikawa et al. | 73/622 X |

FOREIGN PATENT DOCUMENTS

| | | | |
|---|---|---|---|
| 3318420 | 11/1984 | Fed. Rep. of Germany. | |
| 3343558 | 6/1985 | Fed. Rep. of Germany | 414/274 |
| 0158669 | 11/1963 | U.S.S.R. | 414/274 |
| 0844517 | 7/1981 | U.S.S.R. | 414/274 |

*Primary Examiner*—Michael S. Huppert
*Assistant Examiner*—James Keenan
*Attorney, Agent, or Firm*—Spencer, Frank & Schneider

[57] ABSTRACT

An apparatus is disclosed for storing and discharging rod-shaped workpieces of different lengths and types and for the automatic supply of, in particular, a cutting-off machine or a station for processing these workpieces under the control of a computer or the like, with at least one shelf system being provided that is equipped with shelf compartments. A hoist is provided for supplying the shelf system and for removing workpieces from the shelf system. The length of each incoming or outgoing workpiece is determined and the determined length value is appropriately stored in the computer. The length measurement is performed by a length measuring device for determining the distance of the front end faces of the workpieces from an abutment. The length measuring device includes a manually operated device that is operated with ultrasound, light or the like directed onto a wall in the region of the workpiece abutment. The manually operated device is equipped with an extension in the form of an abutment for placement against the front end face of the respective workpiece. The manually operated device is coupled with the computer by way of a data exchange device which provides information about the length and type of the workpiece. The length values of the workpieces determined by the manually held device are fed into the computer by actuation of a handle on the manually operated device.

13 Claims, 5 Drawing Sheets

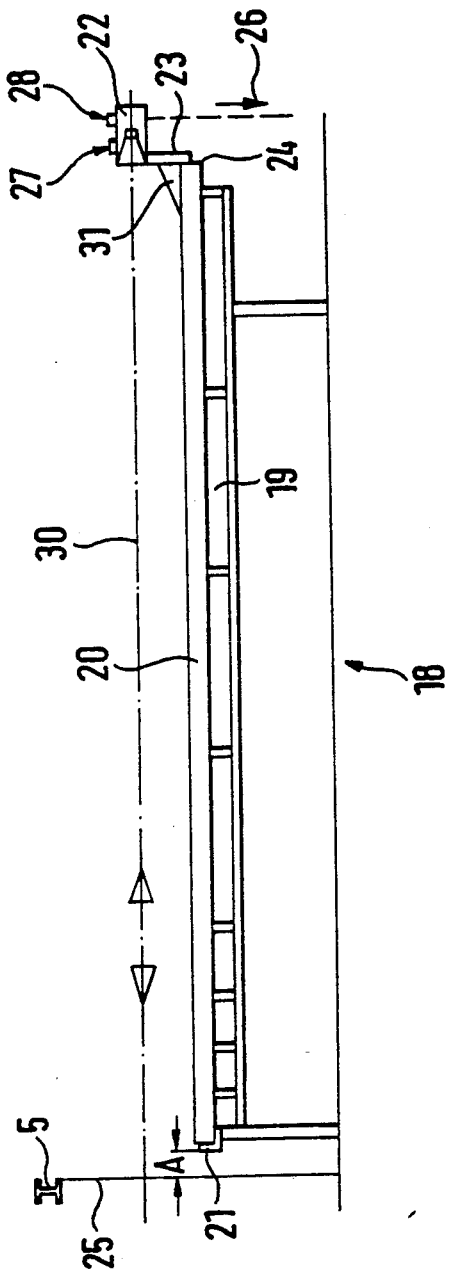

APPARATUS FOR STORING AND DISCHARGING ROD-SHAPED WORKPIECES

CROSS REFERENCE TO RELATED APPLICATION

This application claims the priority of Application Ser. No. P 41 37 440.1, filed Nov. 14, 1991, in the Federal Republic of Germany, the subject matter of which is incorporated herein by reference.

BACKGROUND OF THE INVENTION

The present invention relates to an apparatus for storing and discharging rod-shaped workpieces of different lengths and types or cartridges containing same and for the automatic supply, under the control of a computer or the like of, in particular, a cutting-off machine or a station for processing these workpieces, with at least one shelf system being provided which is equipped with superposed shelf compartments or honeycombs and a hoist for filling the shelves and for removing the workpieces or cartridges from the shelves. The hoist is movable along the shelf or shelves and transversely thereto. When a workpiece is stored or removed, its length is determined and the resulting value is stored in the computer. A length measuring device is provided for detecting the distance of the front end faces of the workpieces from an abutment for the rear end faces of the workpieces.

In such apparatus the different lengths of the rod-shaped workpieces require inventory administration for each individual workpiece and this requires the compilation of data for each workpiece. Moreover, it is necessary to administer each individual workpiece in order to determine whether certain ordered lengths can be sawed or processed from the respective workpiece material. In this connection it is of eminent importance to be informed of the lengths of the workpieces to be stored or discharged so that orders to supply a cutting-off machine or a processing station, generally referred to herein as a workpiece processing system, can be filled as best as possible in that the best suitable workpiece lengths are held available.

It is already known to determine the lengths of rod-shaped workpieces by determining their weight in that this weight is then converted into a length dimension under consideration of the workpiece material and its cross section. However, this manner of proceeding is extremely inaccurate since, particularly in raw materials, fluctuations in the cross sections occur which add up over the length of the workpiece and may lead to corresponding error values in the length determination.

An apparatus of the above-mentioned type is disclosed in German Patent 3,318,420. Here the abutment for the rear faces of the workpieces has an associated slide that is movable relative to the abutment to be placed against the front end faces of the workpieces and is connected with a pulse generator which records the length of the path traveled by the slide toward the front end face of the workpiece and then feeds the thus determined length value for the workpiece to the computer. However, this apparatus, which operates in the manner of a slide rule, is slow since each individual workpiece must be detected by way of a complicated travel path. Moreover, in cooperation with the hoist, only a single workpiece can be "processed" with respect to its length determination. The result is that economic storage or discharge of layers of several workpieces, perhaps also of different types, is not possible. Thus the prior art apparatus is time consuming. It is also very cumbersome and complicated with respect to the apparatus itself.

SUMMARY OF THE INVENTION

It is therefore an object of the invention to configure an apparatus of the above-mentioned type so that it permits measurements of the length of the material very quickly and reliably and also in immediate succession for several workpieces and simultaneously permits reliable identification of the respective type of workpiece. Nevertheless the apparatus should be of a simpler and space-saving configuration.

This is accomplished by the present invention in that the length measuring devices includes a portable, manually controlled device that operates with waves propagable in air, such as ultrasound, light or the like that is directed onto a wall in the region of the workpiece abutment. The manually controlled device has an extension member which is configured as an abutment with which it can be placed against the front end face of the respective workpiece. The manually controlled device further includes a device connected with the computer with which it exchanges information regarding the length and type of the workpiece. The manually controlled device is further provided with a handle with which the workpiece length values determined by the manually controlled device can be fed into the computer.

With these measures according to the invention a manually controlled device is employed which can easily be operated by a operator who is required in any case at this location. The manually controlled device includes a measuring component for measuring the lengths of various workpieces, the measuring component being in data exchange communication with the computer with respect to the values for the type of workpiece and its length by way of appropriate computer communication means. Thus it is possible, for example, to call up, in dialogue with the computer, the type—and thus possibly also its location within the shelf system, if necessary—for the respective workpiece involved. The manually controlled device includes an extension member that can be placed against the front end face of the workpiece in order for the measuring component to determine the length of the workpiece in correspondence with the wall. The thus determined workpiece length can then be fed into the computer in association with the type of the workpiece and its storage location within the shelf system by actuation of the handle on the manually controlled device. In this connection it is also possible for the computer to again display the determined values on a monitor on the manually controlled device for verification.

If a plurality of juxtaposed workpieces of the same or different type are in contact with the abutment in the measuring station, the operator is able to process in stages one workpiece after the other in the same manner in one pass which is possible in the described manner by the rapid succession of the process steps. The hoist can then pick up the workpieces successively for storage in the shelf system in a rhythm defined by the length measurements or they can pick up a cartridge or feed it to a workpiece processing system. Thus the tasks of storage and removal from storage on the one hand and measuring are not coupled with one another so that an operator is able to perform other tasks during the storage and removal from storage.

The measures according to the invention thus result in an increase in the number of identifying components and in the number of workpieces that can be measured in succession in one pass in spite of the small requirements for space and apparatus, with each individual measuring process being accomplished extremely easily and quickly. Finally, the configuration of the manually controlled device and its simple extension member for placement against the respective workpiece makes it completely independent of the respective profile shape of the workpiece.

According to one possibility, it may be provided that wall and measuring component cooperate in a non-reflective process, with the wall constituting the transmitter and the measuring component the receiver. However, it may just as well be provided that the wall and the measuring component cooperate in a reflecting process in which case the wall is the reflector and the measuring component the transmitter and the receiver.

In all cases it may be provided that the signal transmission between the computer and the measuring component is effected by radio waves, cables, infrared light or the like, depending on which one of these possibilities appears to be most expedient for the case at hand.

As a further feature of the length measuring device it may be provided that the extension member in the form of an abutment additionally includes a support member for placement onto the respective workpiece. In this way, care is taken in principle that the area of correspondence between the measuring component and the wall lies outside of interferences that may be caused by the respective workpiece, for example due to reflections. The support member may normally follow the extension member at a right angle in the direction of the respective workpiece.

For other cases which might raise greater difficulties particularly with respect to the profile shape of the workpieces, it may also be advisable for the support member to enclose an angle of slightly more than 90° with respect to the extension member. In this case the area of correspondence between manually controlled device and wall is intentionally freed from the profile shape of the workpiece. It is of course understood that now the sloped position of the manually controlled device realized by the support member produces a change in the distance value between the manually controlled device and the wall which must be appropriately compensated in the computer.

Regarding the configuration of the length measuring device, it may include a supporting rack for the workpieces which is disposed parallel to the shelf compartments, with being movable into this position, and being provided at the rear end thereof facing the wall with the workpiece abutment for the workpiece rear faces while being accessible at the front end thereof and from the sides.

In this way, the workpieces can be positioned with the aid of a simple rack and can be brought in contact with the abutment, with it being possible to deposit a number of workpieces that correspond to the size of the rack next to one another to produce a continuous processing sequence. The operator is then able to access the rack by means of the manually controlled device from the side opposite the abutment in order to determine the respective workpiece length, with the lateral accessibility being envisioned particularly for relatively short workpiece lengths.

It has been found to be particularly advantageous for the wall to be arranged at a distance outside of the region taken up by the supporting rack next to the abutment and parallel thereto. In this way it is possible to consider special structural shapes of the hoist if the latter must be downwardly displaceable by means of a telescoping carriage in the region outside of the ends of the supporting rack. With such a structure, the individual length measuring process is then performed in such a way that an information stored in the computer and based on a length measurement made between the manually controlled device and the wall always subtracts a fixed amount which constitutes the distance between the abutment for the workpieces and the wall.

However, it may also be advisable for the wall to be disposed within the area occupied by the supporting rack next to the abutment and parallel thereto, with the distance from the abutment being shorter than the shortest possible workpiece length. Such a configuration may likewise be found to be advisable and permit the above described marginal conditions to be filled as well.

As a further feature of the invention it may be provided that a fixed post is provided in the region of the front end of the supporting rack and that the measuring component of the manually controlled device can be coupled with the fixed post, for example by way of a plug-in connection, in order to recalibrate the distance from the wall. This possibility thus provides a way to take care, from time to time or after work pauses or several successive length measurements, etc., that a shift that might result in the basic setting of the measuring component relative to the wall is compensated again.

If such a fixed post is provided it may advantageously simultaneously serve as a depository and storage location for the manually controlled device. In this connection it is possible, for example, to recharge a battery that is contained in the manually controlled device.

Finally, it is also possible for the measuring component to include an intermediate memory for storing the measuring task at the fixed post which is connected with the computer and to feed the measured value to the computer by way of the fixed post. In this way, it is possible to install a fixed connection between the fixed post and the computer so that no means for a direct transmission of data between the manually controlled device and the computer need be provided.

BRIEF DESCRIPTION OF THE DRAWINGS

Further features and details of the invention will become evident from the description below of an embodiment of the invention that is illustrated in simplified form in the drawing figures, in which:

FIG. 5 is a partial side elevational view of the subject matter of FIG. 4.

DETAILED DESCRIPTION OF THE PREFERRED EMBODIMENTS

Figure 1:
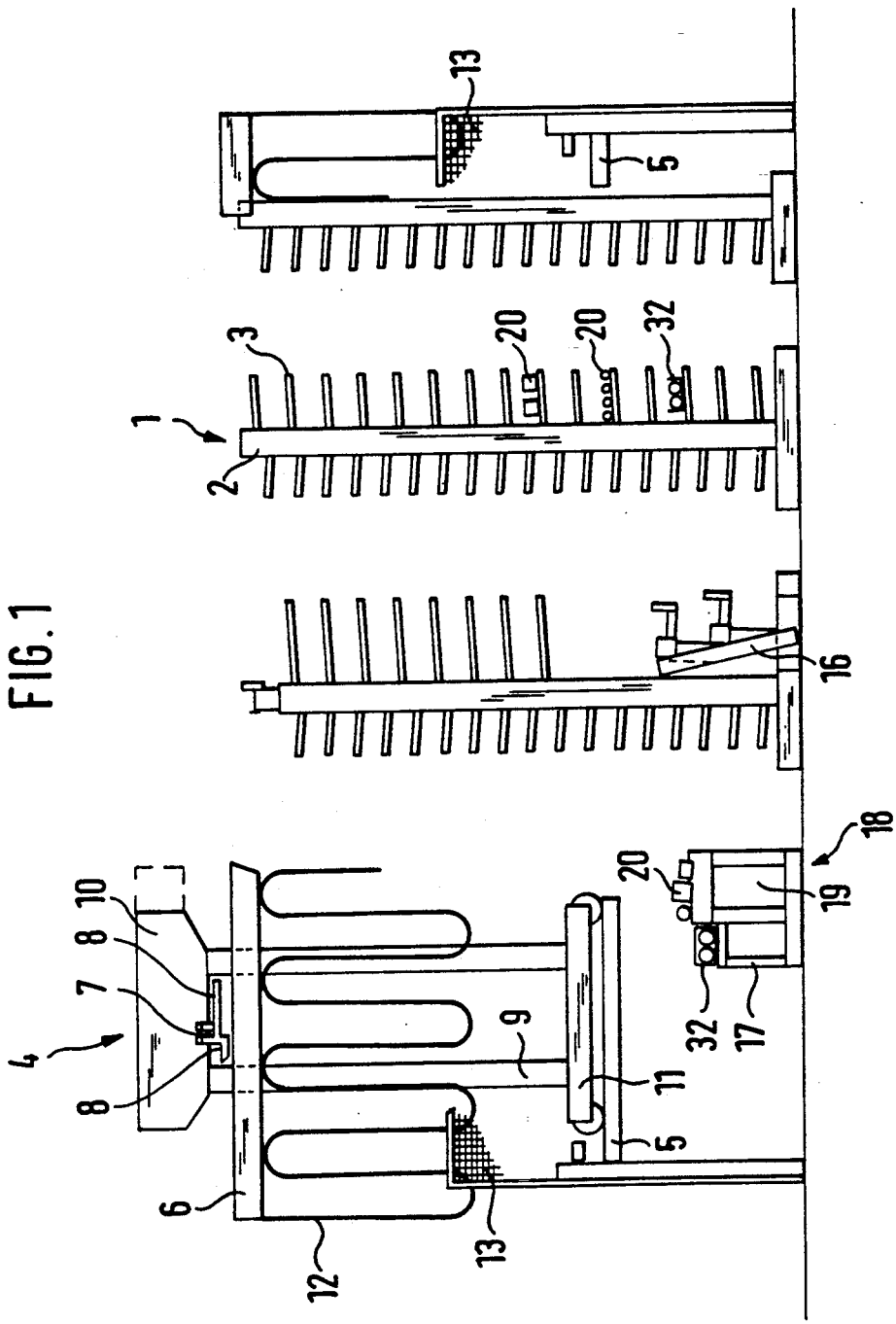
FIG. 1 is a side elevational view of a shelf system.
Figure 2:
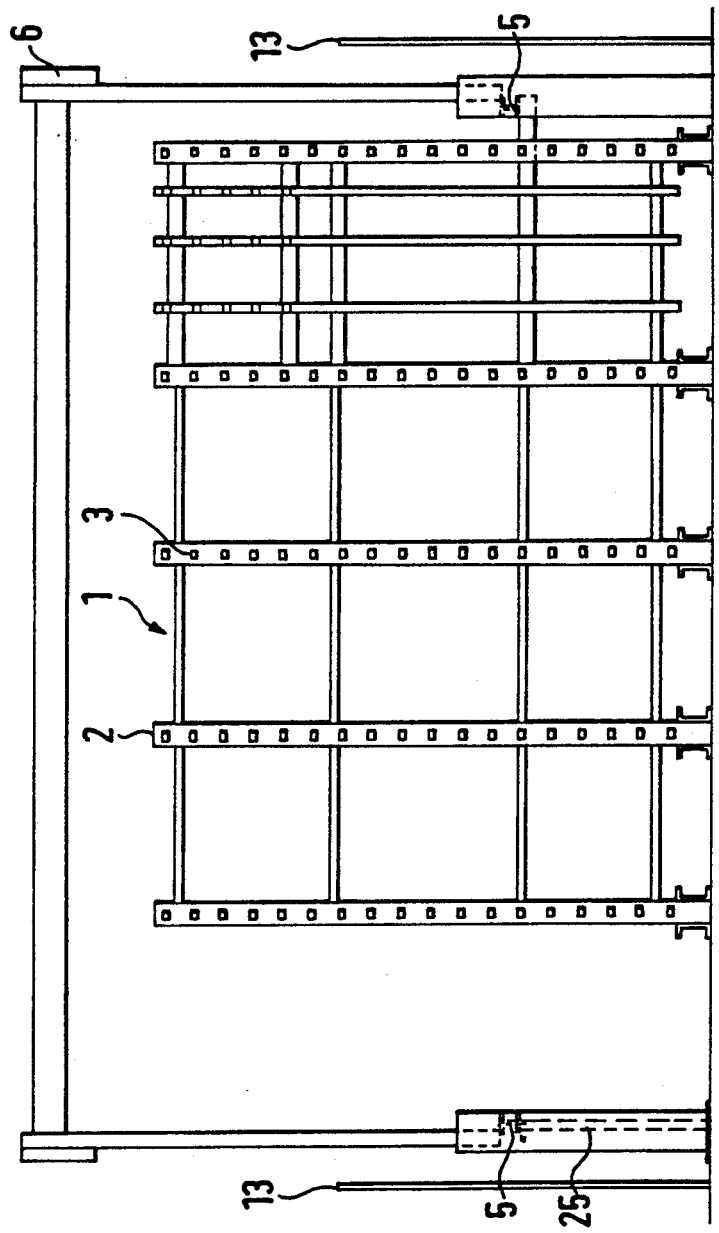
FIG. 2 is a vertical sectional view of the shelf system of FIG. 1.
Figure 3:
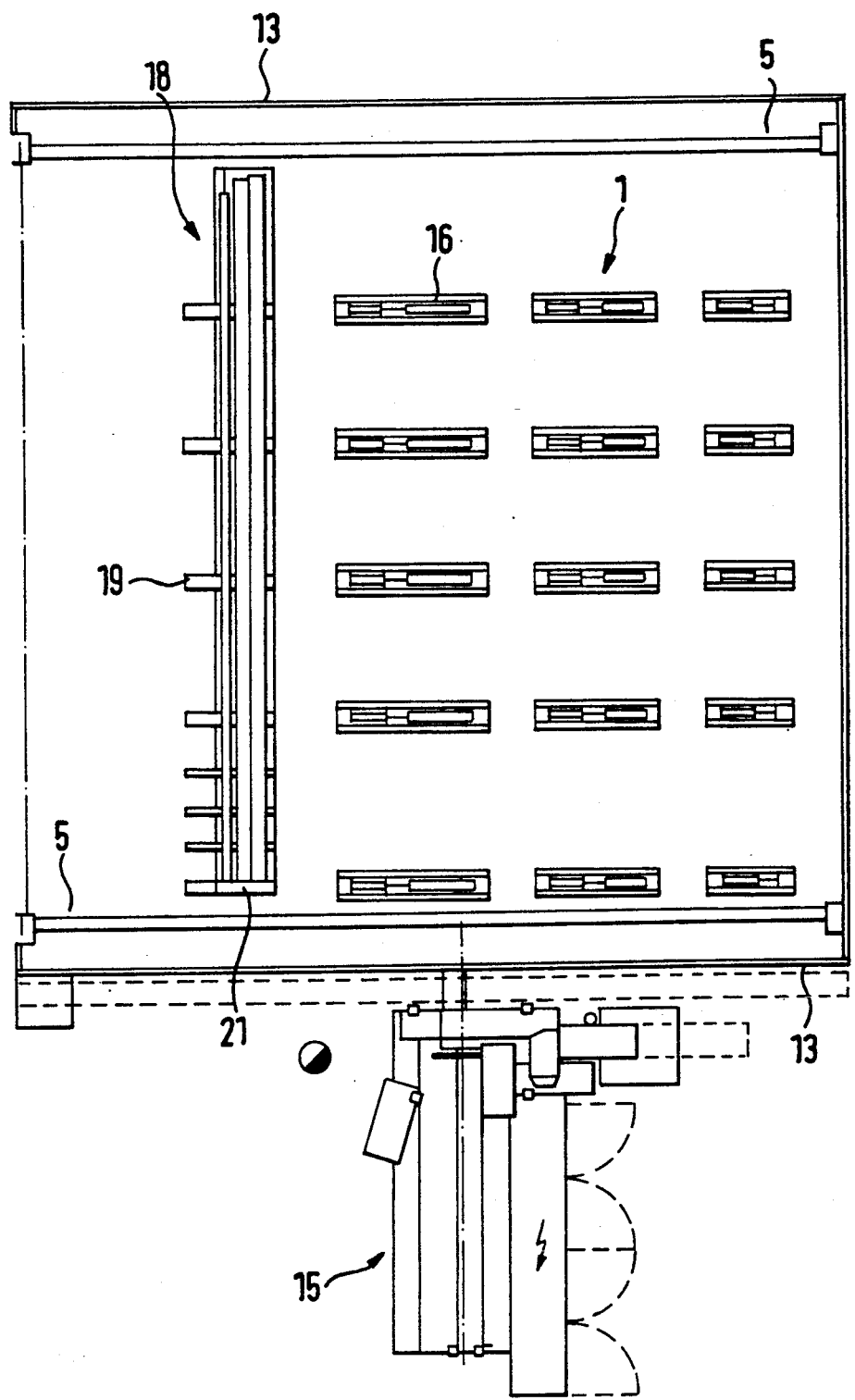
FIG. 3 is a top plan view of the shelf system of FIG. 1.

FIGS. 1 to 3 depict in a simplified form a storage arrangement for rod-shaped workpieces 20 or cartridges 32 containing them. The storage system includes storage shelves 1 composed essentially of shelf supports 2 and supporting arms 3 attached thereto to form superposed compartments. A hoist in the form of a portal crane 4 can be moved over the storage shelves 1 along rails 5. The hoist includes a crane bridge 7 to which are attached loading forks 8 that are spaced one behind the other in a direction perpendicular to FIG. 1. This crane bridge is displaceable in the vertical direction between the vertical supports 9 of the hoist, with these supports constituting the connection between portal 10 and the drive mechanism 11 of the hoist on both sides of shelves 1. The reference numeral 12 identifies an electrical line to supply the hoist with energy. This line is fastened to a rail 6 and is movable along this rail as required.

Reference numeral 13 identifies safety grids—indicated only in FIG. 1—which are disposed on both sides of the shelf system.

The compartments in the shelves formed by supporting arms 3 serve to accommodate rod-shaped workpieces 20 or cartridges 32, with a compartment being assigned to a certain type of workpiece, that is, to workpieces made of a certain material and having a certain cross-sectional configuration. With the aid of a computer shown in simplified form in FIG. 4 and bearing reference numeral 14 the storage system is maintained in a known manner so that it is possible to state precisely in which shelf compartment what material is disposed and how many workpieces of which lengths and in which sequence according to length of this material are presently stored next to one another in the respective compartment. Based on this information, a workpiece processing system such as a cutting-off machine 15 shown generally in FIG. 3 can be supplied from this depository formed of the shelves in that the individual pieces of material are brought with the aid of the hoist into a changing station 16 which is flush with the cutting-off machine and is shown in FIG. 1. It is also possible to return the pieces remaining in station 16 back to storage. Or individual workpieces can be picked up from the storage system according to type of material and length of the individual workpiece and can be brought to a processing station shown in simplified form at 17 in FIG. 1.

To build up this storage system with the aid of computer 14 and to ensure its operation, a removal and storage station is provided which is shown generally in FIGS. 1 and 3 at 18. It is disposed next to the shelves 1 and parallel thereto in the range of longitudinal movement of hoist 4 such that it can be accessed by the hoist, or is movable into that position from outside the shelf arrangement, with of course station 18 also possibly being placed between the shelves of larger shelf systems.

This removal and storage station 18 includes a supporting rack 19 in which the rod-shaped workpieces 20 can be deposited, either individually or also in bundles, with it being immaterial whether the bundles contain workpieces of the same type or of different types. The depositing of workpieces 20 on supporting rack 19 may be effected externally or by the action of hoist 4. In any case, it is hoist 4 which moves workpieces 20 from supporting rack 19 into storage in the individual compartments of shelves 1.

Figure 4:
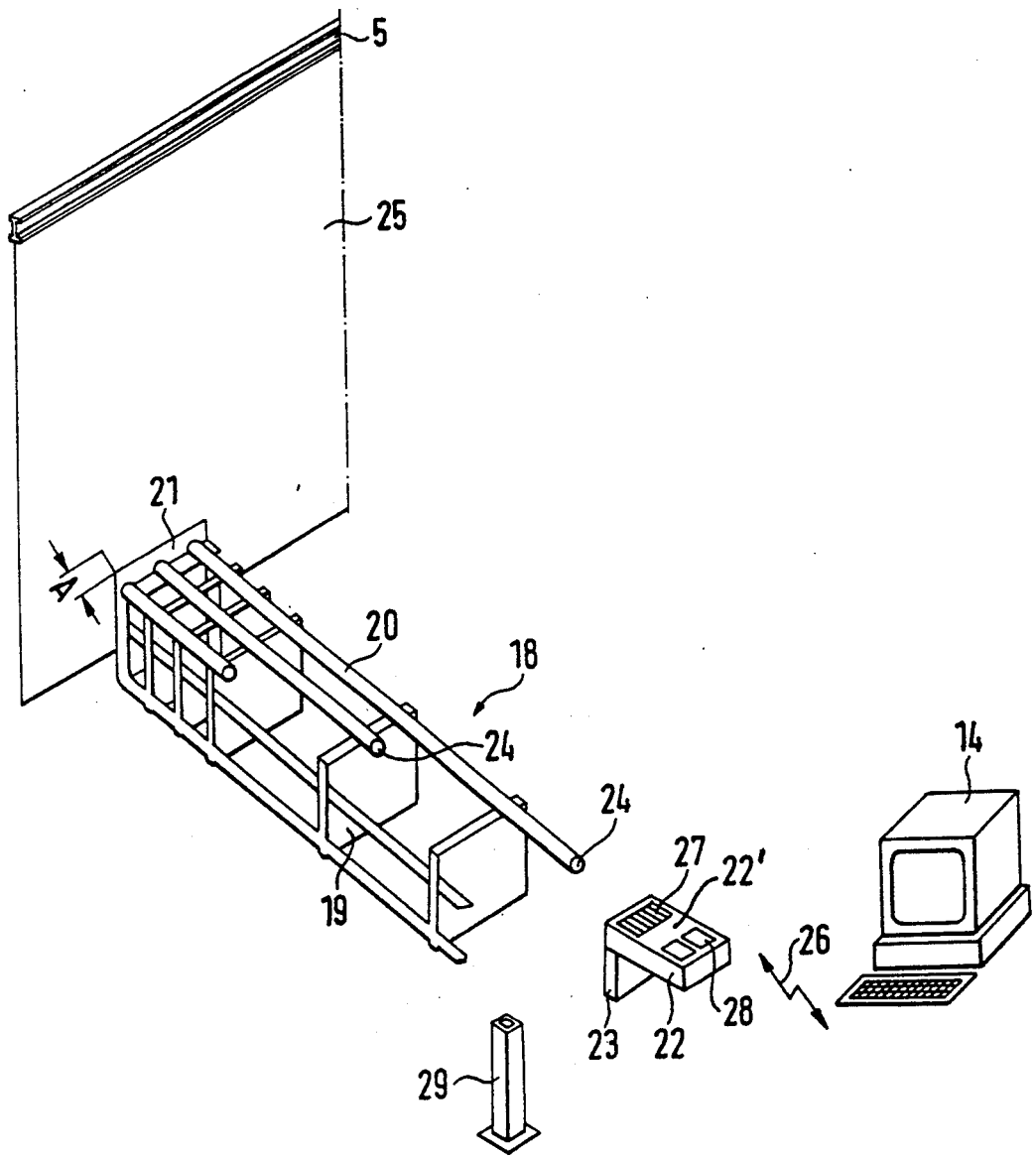
FIG. 4 is a perspective detail view of the shelf system of FIG. 1.

The mentioned removal and storage station is shown in greater detail in a simplified form in FIGS. 4 and 5. Here supporting rack 19 can again be seen on which the rod-shaped workpieces 20 are deposited. In order to now effect a precise length measurement of the workpieces, supporting rack 19 is provided with an abutment 21 for the rear end faces of workpieces 20 against which the workpieces are pushed in the course of their placement onto rack 19 by an operator who is present in any case. To facilitate this work, supporting rack 19 may be provided with a possibly driven roller conveyor for material 20.

Then, a portable, manually controlled device 22 serves to determine the length. Manually controlled device 22 includes a measuring component 22' for measuring the lengths of the various workpieces, and an extension member 23 on the device in the form of an abutment that can be brought into contact with the front end faces 24 of workpieces 20 disposed opposite abutment 21. The measuring component 22' is thus configured as a length measuring device which operates with waves propagable in air, such as ultrasound, light or the like directed onto a wall 25 in the region of workpiece abutment 21. This measuring component is in communication with computer 14 by way of radio waves, cables or infrared light or the like as indicated by the double arrow 26.

The measuring component includes a display 27 and an operator keyboard 28.

In the thus described configuration of the device, the manually controlled device and its extension member 23 can be successively placed against the front end faces 24 of workpieces 20, thus simultaneously displaying the respectively measured material on display 27 through data exchange with computer 14 by means of keyboard 28. Now the length is measured by means of waves propagable in air, such as ultrasound, light or the like in cooperation between measuring component 22' of manually controlled device 22 and wall 25, resulting in the length of the respective workpiece rod 20 that has been scanned. The value determined in this way is also fed to computer 14 by actuation of keyboard 28 and is thus stored. In conjunction with this activity the respectively sampled material rod is then moved to its assigned location within a storage shelf or to processing station 17. Thus an accurate warehousing system has been established with respect to the storage shelves because now it is recorded within computer 14 which workpieces of what length are disposed in the respective shelf compartment and—what amounts to the reverse procedure—which workpieces have been removed from the respective shelf compartment.

If configured appropriately, manually controlled device 22 ma also make it possible that the values stored in the computer are returned once more separately by the computer so that it is possible in this way to monitor the input just made.

As can be seen, with this configuration of the device for determining the length of workpieces it is easily possible to measure a larger number of workpieces deposited on supporting rack 19 in immediate succession, with it also being possible to measure different types of workpieces (material and cross section) since for each workpiece to be measured, the type of workpiece is first called up in a data exchange with computer 14 and this can be shown on display 27 in order to be available for input in association with the determined length.

As can be seen in FIGS. 4 and 5, wall 25 is disposed at a distance A from abutment 21 below the adjacent runner 5 for the hoist. The reason for this is that, as can be seen in FIG. 1, runners 5 are disposed above supporting rack 19 so that bridge 7 and loading forks 8 must be movable downwardly past the two ends of supporting rack 19, while on the other side wall 25 should not stand in the way between abutment 21 and the means of the hoist.

As can be seen in FIG. 4, a fixed post 29 is additionally provided which is located at a defined distance from wall 25. This fixed post serves to regularly recalibrate measuring component 22' with respect to the distance determination from wall 25. For this purpose, the extension member 23 of manually controlled device 22 may be brought into contact with fixed post 29 in which case the known distance between fixed post 29 and wall 25 can be checked in the output of the manually controlled device and can be corrected if required.

The fixed post may also serve to provide a support or storage location for manually controlled device 22 in which case additional means may be provided for charging a battery included in manually controlled device 22.

As can be seen particularly in FIG. 5, wall 25 is disposed below the rail 5 that is adjacent to the rear end of the supporting rack 19 which includes abutment 21. In this way, wall 25 is not in the way of the movements of the hoist.

In summary, the apparatus described as a whole in connection with FIGS. 1 to 5 makes it possible in a simple and fast manner to store or remove a larger number of workpieces in succession without this requiring a complicated and space consuming arrangement. In this connection, it should be pointed out, in particular, that in the region of the length measuring station serving for removal and storage a plurality of workpieces can simultaneously be covered in succession in a fast process for detection of their lengths and the resulting data can be forwarded to computer 14 for further processing, with the loading forks 8 of bridge 7 also being able to be employed over their full width.

Finally, FIG. 5 shows another feature of manually controlled device 22 where extension member 23 is additionally provided with a support member 31 for placement onto the respective workpiece 20. This support member serves essentially to hold measuring component 22' at a sufficient distance above the workpiece material so that reflections or the like are excluded. For this purpose it is normally sufficient if support member 31 is attached at a right angle to extension member 23. It may, however, be advisable, particularly in view of workpiece materials that have a very rough surface, for support member 31 to enclose an angle slightly larger than 90° relative to extension member 23. In this way the corresponding connection 30 between manually controlled device 22 and wall 25 then has a slightly upwardly directed slope so that it comes free from material 20. It is a matter of course that the change in the distance between manually controlled device 22 and wall 25 resulting from this slope must be compensated in the computer.

With respect to fixed post 29, it should be pointed out that this post may also serve to supply the measuring task to be performed to measuring component 22', presuming it is coupled accordingly, whereupon after completion of the measurement the measuring component is able to forward the determined values to fixed post 29 again over the appropriate coupling means. For this purpose it is merely necessary for measuring component 22' to be equipped with an intermediate memory. On the other hand, a connection 26 to computer 14 is then not necessary if it is possible to thus connect fixed post 29 permanently with computer 14 by way of appropriate connection means.

It will be understood that the above description of the present invention is susceptible to various modifications, changes and adaptations, and the same are intended to be comprehended within the meaning and range of equivalents of the appended claims.

What is claimed is:

1. An apparatus for storing and moving rod-shaped workpieces of various lengths, each of said workpieces having a front end face and a rear end face, said apparatus comprising:
   (a) at least one shelf system including superposed shelf compartments for storing said workpieces;
   (b) a moving means for moving said workpieces to and from said at least one shelf system, said moving means further being adapted to supply said workpieces to a workpiece processing system, said moving means including a hoist movable both along and transversely to said at least one shelf system;
   (c) a length measuring device for measuring the various lengths of said workpieces; said length measuring device including:
      (1) a supporting rack for supporting said workpieces during a length measurement thereof, said supporting rack including a front end and a rear end and being arranged parallel to said shelf compartments, said supporting rack further being accessible by said hoist and comprising, at the rear end thereof, a workpiece abutment against which the rear end faces of workpieces to be measured and abutted for defining a measurement position of said workpieces;
      (2) a portable, manually controlled device for measuring the various lengths of said workpieces, said manually controlled device comprising:
         (i) a manually controlled measuring component using waves propagable in air for measuring said various lengths when said workpieces are in said measurement position, said waves being directed onto a wall disposed adjacent said workpiece abutment;
         (ii) an extension member extending from said measuring component and adapted to be abutted against the front end faces of said workpieces when said workpieces are in said measurement position, said extension member thereby serving to position said measuring component with respect to said wall during the length measurement of said workpieces; and
         (iii) a communication means for transmitting signals representing materials, cross-sectional configurations, and measured lengths of said workpieces; and
   (d) a computer for storing measured values of said various lengths, said computer further being effective for storing information regarding different materials and various cross-sectional configurations of said workpieces; said computer receiving said signals from said communication means.

2. The apparatus according to claim 1, wherein said wall and said measuring component cooperate in a non-reflecting process, said wall constituting a wave transmitter and said measuring component constituting a corresponding wave receiver.

3. The apparatus according to claim 1, wherein said wall and said measuring component cooperate in a reflecting process, said wall constituting a wave reflector and said measuring component constituting a corresponding wave transmitter and wave receiver.

4. The apparatus according to claim 1, wherein a transmission of said signals between said measuring component and said computer is effected by way of waves propagable in air.

5. The apparatus according to claim 1, wherein a transmission of said signals between said measuring component and said computer is effected by cables.

6. The apparatus according to claim 1, wherein said manually controlled device further includes a support member disposed on said extension member such that when said extension member abuts against the front end face of a respective workpiece to be measured, said support member can be placed onto said respective workpiece thereby holding said measuring component at a distance above said respective workpiece sufficient for excluding a reflection of said waves from said respective workpiece back to said measuring component.

7. The apparatus according to claim 6, wherein a right angle is defined between said extension member and a side of said support member adapted to be placed onto said respective workpiece.

8. The apparatus according to claim 6, wherein an angle of slightly more than 90° is defined between said extension member and a side of said support member adapted to be placed onto said respective workpiece.

9. The apparatus according to claim 1, wherein said wall is disposed next to said abutment, parallel thereto, and at a distance therefrom.

10. The apparatus according to claim 1, said apparatus further including a fixed post disposed near the front end of said supporting rack, said fixed post comprising a coupling means provided thereon for allowing a coupling of said measuring component to said fixed post in order to permit recalibration of said measuring component with respect to said wall.

11. The apparatus according to claim 10, wherein said coupling means includes a plug-in connection.

12. The apparatus according to claim 10, wherein said fixed post constitutes a depository of and a storage location for said manually controlled device.

13. The apparatus according to claim 10 and further including a connection means for connecting said fixed post to said computer, said measuring component including an intermediate memory means for receiving measuring instructions from said fixed post and thereafter feeding measured values of said various lengths to the computer via said connection means.

* * * * *